United States Patent
Zensai

(10) Patent No.: US 7,626,653 B2
(45) Date of Patent: Dec. 1, 2009

(54) LIQUID CRYSTAL DISPLAY DEVICE

(75) Inventor: Atsunori Zensai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 122 days.

(21) Appl. No.: 12/068,551

(22) Filed: Feb. 7, 2008

(65) Prior Publication Data

US 2009/0009680 A1    Jan. 8, 2009

(30) Foreign Application Priority Data

Feb. 8, 2007    (JP)    ............... 2007-029525

(51) Int. Cl.
*G02F 1/1333*    (2006.01)
(52) U.S. Cl. ............... 349/58; 349/1; 349/13; 349/14; 349/56
(58) Field of Classification Search ............ 349/1, 349/13, 14, 56, 58
See application file for complete search history.

(56) References Cited

U.S. PATENT DOCUMENTS

| | | | |
|---|---|---|---|
| 6,304,308 B1 * | 10/2001 | Saito et al. ............ 349/155 |
| 6,538,709 B1 * | 3/2003 | Kurihara et al. ............ 349/58 |
| 2003/0048629 A1 | 3/2003 | Kim et al. |
| 2003/0133056 A1 | 7/2003 | Lai |
| 2004/0008512 A1 | 1/2004 | Kim |
| 2005/0057946 A1 | 3/2005 | Kim |

FOREIGN PATENT DOCUMENTS

| | | |
|---|---|---|
| JP | 05-066390 | 3/1993 |
| JP | 2000-258756 | 9/2000 |
| JP | 2003-195263 | 7/2003 |
| WO | WO 2006/135065 A1 | 12/2006 |

* cited by examiner

*Primary Examiner*—Jennifer Doan
(74) *Attorney, Agent, or Firm*—Morgan Lewis & Bockius LLP

(57) ABSTRACT

The liquid crystal display device has a rear frame, a reflection sheet, a backlight, a pair of light frames, a liquid crystal panel, a bezel. The device further includes a cell guide for fixing the liquid crystal panel. In the cell guide, engagement portions are formed, and engaged with corresponding locking portions formed in the pair of light frames.

5 Claims, 3 Drawing Sheets

LIQUID CRYSTAL DISPLAY DEVICE

CROSS-REFERENCE TO RELATED APPLICATIONS

This application is based on Japanese Patent Application No. 2007-029525 filed on Feb. 8, 2007, the contents of which are hereby incorporated by reference.

BACKGROUND OF THE INVENTION

1. Field of the Invention

The present invention relates to a liquid crystal display device that can prevent a cell guide for retaining a liquid crystal cell from falling away in assembling.

2. Description of Related Art

Liquid crystal display devices are slim in body, light in weight and low in power consumption, and have been widely used for notebook-size personal computers, monitors of personal computers, television sets for household use, etc. Such liquid crystal display devices each have a liquid crystal panel for displaying an image, and a backlight for radiating light from the rear face side of the panel. The light emitted by the backlight is made to pass through the liquid crystal panel or blocked by the liquid crystal panel, whereby an image is formed on the front side of the liquid crystal panel.

To achieve an image with a higher luminance and a less luminance non-uniformity in a liquid crystal display device, it is necessary that the backlight and liquid crystal panel be supported and fixed close to each other. The backlight is attached to a rear frame made of a metal, and retained by a light frame made of a resin from its upper face side. The light frame is fixed to the rear frame.

The liquid crystal panel has a cell guide which is a frame of a rectangular form, a diffusion plate and a diffusion sheet, both for diffusing light from the backlight, and a liquid crystal cell having a pair of rectangular glass substrates with liquid crystal filled in the space therebetween. In the liquid crystal panel, the diffusion plate and the diffusion sheet are pressed by the cell guide against the upper face of the rear frame and the light frames and fixed. The liquid crystal cell is retained on the upper face side of the cell guide. In the condition where the cell guide holds down the diffusion plate and the diffusion sheet toward the upper face of the rear frame and the light frames and retains the liquid crystal cell on its upper face, a bezel, which is a frame having a rectangular form, is put on the cell guide from the upper face side of the cell guide, followed by bolting together the bezel, the cell guide and the rear frame or the light frames. Thus, a liquid crystal display device that can offer an image with a higher luminance and a less luminance non-uniformity is fabricated.

In assembling the liquid crystal panel as described above, the diffusion plate and the diffusion sheet are placed on the upper face of the rear frame and the light frames, and then the cell guide is placed thereon from the upper face side. Further, the cell guide is secured by bolts together with the bezel and the rear frame or the light frame. As a result, if the cell guide, and the rear frame and the light frames are out of their right positions even slightly, the work to adjust their relative positions becomes necessary, which lowers the working efficiency. In addition, when the work to adjust their relative positions is carried out, the diffusion plate and the diffusion sheet held down by the cell guide and the liquid crystal cell retained on the upper face side of the cell guide can be out of position, which can pose an additional troublesome work.

To solve such problems, a conventional liquid crystal display device has bosses formed on the light frame and protruding from the upper face thereof, in which positioning of the cell guide with respect to the rear frame and the light frames is performed by fitting the bosses in corresponding boss holes formed in the cell guide.

In recent years, liquid crystal display devices have tended to be upsized. A member composed of four cell guide pieces each including a corner portion has been used as the cell guide with the upsizing of liquid crystal display devices. Also, for the bezel, a member composed of four bezel pieces each making one side of a rectangle has been used. As the cell guide can be divided, just engaging the boss holes of the cell guide with the bosses formed on the upper face of the light frame as conventionally performed can bring the diffusion plate, the diffusion sheet and the cell guide out of position, making the work difficult.

Hence, adopted is a method which includes: placing the cell guide on the rear frame and the light frames from the upper face; in this condition, temporarily fixing the cell guide to the rear frame and the light frames by bolts; and placing the bezel thereon and securing them together by bolts.

Also, there has been known a liquid crystal display device as disclosed by JP-A-5-66390, in which electrically-insulative retaining members for retaining a support frame, a liquid crystal display panel, a light-guide plate, a light source and an input-output lead wire are used to perform positioning of the respective members.

Further, according to the invention disclosed by JP-A-2000-258756, a liquid crystal module is presented, in which when an outer frame is attached, an engagement nail formed on a resin frame to be placed inside the module is engaged with a hole formed in the outer frame, whereby the outer frame is attached.

Further, according to the invention disclosed by JP-A-2003-195263, a liquid crystal display device is presented, in which hooks are formed on a frame for covering a peripheral portion of a liquid crystal element, the hooks are used to fasten the liquid crystal element between the frame and a metal housing, and therefore the liquid crystal element is fixed by engaging the hooks with the metal housing.

However, the cell guide will end up as being bolted together with the bezel and the rear frame or the light frames. Therefore, two types of bolts, namely ones for temporarily retaining the cell guide and ones for fastening the bezel and cell guide together, are required, which increases the number of constituent members and the number of steps for the attachment, and thus raises the manufacturing cost.

In addition, the bezel needs through-holes for temporary retaining thereof and through-holes for securing it together with the other member. Hence, the strength of the bezel is deteriorated correspondingly to the through-holes thus formed, and large amounts of human efforts and time are required to manufacture the bezel.

Further, according to the invention disclosed by JP-A-5-66390, the retaining members for positioning constituent members are provided, and correspondingly the number of constituent members is increased and thus the manufacturing cost is raised.

Moreover, as to a large-size liquid crystal display device, it is difficult to use an outer frame as the bezel to firmly hold down the liquid crystal cell including the cell guide as in the case of the invention disclosed by JP-A-2000-258756. In addition, with this structure, it is necessary to deform the outer frame, for which it is undesirable to be deformed, in order to engage the outer frame with engagement nails.

SUMMARY OF THE INVENTION

Therefore, it is an object of the invention to provide a liquid crystal display device having a simple structure, which does not increase the number of parts, offers no trouble in assembling, and allows constituent parts including a liquid crystal cell, a diffusion plate and a diffusion sheet to be fixed without fail.

Also, it is an object of the invention to provide a liquid crystal display device that can minimize, even temporarily, deformation of a member such that deformation is undesired, and enables simplification of the assembling steps thereby to reduce the manufacturing cost.

A liquid crystal display device according to an embodiment of the invention has: a rear frame which is formed by cutting and bending a metal plate and which includes a rectangular bottom portion, a pair of connecting portions extending from two longer sides of the bottom portion slantwise upward with respect to the bottom portion, and a pair of support portions bent from the respective connecting portions outwardly in parallel with the bottom portion; a pair of light frames for retaining a backlight on its lower side; a rectangular diffusion plate for diffusing light disposed on the pair of light frames and the pair of support portions; a rectangular diffusion sheet superposed on the diffusion plate; a cell guide of a rectangular frame-like form for holding down outer peripheral portions of the diffusion plate and the diffusion sheet; a liquid crystal cell, disposed on an upper portion of the cell guide and having a pair of opposing glass substrates with liquid crystal filled in a space therebetween; and a bezel of a rectangular frame-like form for holding down the cell guide and the liquid crystal cell. The cell guide has: longer side portions; shorter side portions; an engagement portion which is provided vertically downward extending from an outer edge of each shorter side portion on a lower face side of the cell guide, and which has a pouch-like portion open to an inside of the cell guide; and a reentrant portion formed in each shorter side portion on the lower face side. Each of the paired light frames has: bosses protruding from an upper face thereof; and locking portions each having an engagement nail protruding to an outer face side when the pair of light frames is attached to the rear frame, and formed so as to be elastically deformable. The cell guide is positioned by fitting the bosses of the pair of light frames in the reentrant portions, and engaging the engagement portions with the corresponding locking nails of the pair of light frames, and is fastened to the rear frame or the pair of light frames by bolts together with the bezel.

This arrangement does not require the use of bolts for positioning and temporarily fixing of the cell guide. Hence, the number of bolts so used can be reduced, and thus the work required for fastening the bolts can be eliminated.

In addition, as no bolt is used for positioning of the cell guide, the number of boltholes formed in the cell guide can be reduced accordingly. Consequently, the deterioration of the strength of the cell guide can be suppressed.

Thus, the deformation of the cell guide can be suppressed while the liquid crystal panel is kept in close contact with the rear frame and the light frames. Also, the degradation in the quality of an image owing to the deformation of the liquid crystal cell and leakage of light can be suppressed.

As for the preferred embodiment of the invention, the cell guide is composed of four L-shaped members adjoined to one another. Each L-shaped member has a long portion that forms a part of the longer side portion, and a short portion that forms a part of the shorter side portion; the long portions and the short portions are formed so as to intersect at right angles.

As to the preferred embodiment of the invention, at least two locking portions are formed for each of the paired light frames respectively arranged for two shorter sides of the rear frame. Further, at least one engagement portion is formed for the short portion of each L-shaped member.

With the preferred embodiment of the invention, at least one locking portion is formed for each of the paired light frames respectively arranged for two shorter sides of the rear frame. Further, at least one engagement portion is formed for each shorter side portion of the cell guide.

A liquid crystal display device according to another embodiment of the invention has: a rear frame formed by cutting and bending a metal plate, which includes a rectangular bottom portion, a pair of connecting portions extending from two longer sides of the bottom portion slantwise upward with respect to the bottom portion, and a pair of support portions bent from the respective connecting portions outwardly in parallel with the bottom portion; a reflection sheet disposed in close contact with the bottom portion and the pair of connecting portions of the rear frame; a backlight having a set of U-shaped cathode tubes disposed above the reflection sheet; a pair of light frames disposed above the backlight for retaining the backlight; a rectangular diffusion plate for diffusing light disposed on the pair of light frames and the pair of support portions; a pair of rectangular diffusion sheets superposed on the diffusion plate, one of the paired rectangular diffusion sheets stacked on the other; a cell guide of a rectangular frame-like form for holding down outer peripheral portions of the diffusion plate and the pair of diffusion sheets; a liquid crystal cell, disposed on an upper portion of the cell guide and having a pair of opposing glass substrates with liquid crystal filled in a space therebetween; and a bezel of a rectangular frame-like form for holding down the cell guide and the liquid crystal cell. The cell guide is divided into four L-shaped members. Each of the L-shaped members has: a long portion forming a longer side of the cell guide; a short portion adjoining the long portion at a right angle and forming a shorter side of the cell guide; an engagement portion which is provided vertically downward extending from an outer edge of the short portion on a lower face side of the cell guide, and which has a pouch-like portion open to the inside of the cell guide; and a reentrant portion formed on a lower face side of the short portion. Each of the paired light frames has: bosses protruding from an upper face thereof; reentrant grooves formed on an outer face side of the light frame and extending in an up-and-down direction of the light frame; and a locking portion formed inside each reentrant groove. The locking portion has: an adjoining piece integrally formed with and protruded from the light frame; an elastic locking piece provided upright on an upper face side of the adjoining piece; and a locking nail provided and protruded outwardly from an end portion of the elastic locking piece. The cell guide is positioned by fitting the bosses of the pair of light frames in the reentrant portions, and engaging the engagement portions with the corresponding locking nails of the pair of light frames. Further, the cell guide is fastened to the rear frame or the pair of light frames by bolts together with the bezel.

DESCRIPTION OF THE PREFERRED EMBODIMENTS

Figure 1:
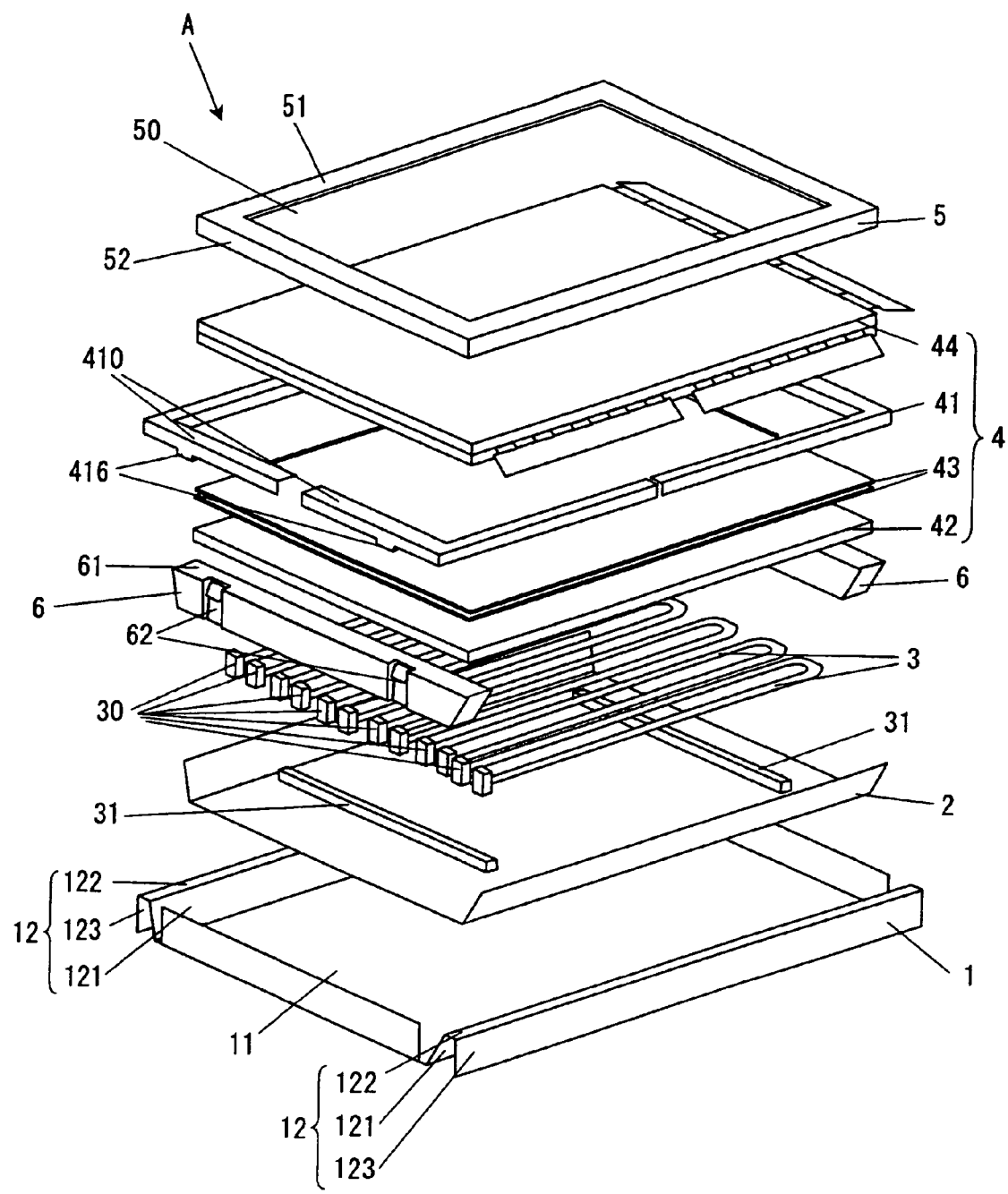
FIG. 1 is an exploded perspective view of a liquid crystal display device according to the invention.

The embodiments of the invention will be described below with reference to the drawings. FIG. 1 is an exploded perspective view of a liquid crystal display device associated with the invention. As shown in FIG. 1, the liquid crystal display device A has, at least, a rear frame 1, a reflection sheet 2, a backlight 3, a pair of light frames 6, a liquid crystal panel 4, and a bezel 5.

The rear frame 1 is formed by bending a metal plate, and it has a rectangular bottom portion 11, and a pair of upstanding portions 12 provided upright on a pair of longer sides of the bottom portion 11. The paired upstanding portions 12 each have a connecting portion 121 standing from the bottom portion 11, a support portion 122 adjoining the connecting portion 121 for supporting a corresponding longer side of the liquid crystal panel 4, and a side-wall portion 123 bent from an end portion of the support portion 122 toward the lower face of the rear frame 1 and opposed to the connecting portion 121.

The reflection sheet 2 is laid out on the upper face side of the bottom portion 11 of the rear frame 1, and it is attached in close contact with the connecting portion 121 and the bottom portion 11 of the rear frame 1. After the reflection sheet 2 has been disposed, the backlight 3 is disposed on the upper face side of the rear frame 1. The backlight 3 is composed of U-shaped cathode tubes, and has lamp holders 30 attached to two end portions of each tube. To the lamp holder 30 is connected an electric cable, which is not shown in the drawing. An electric power to activate the backlight 3 is supplied through the electric cable. Also, the reflection sheet 2 is provided with a pair of light support members 31, and the pair of light support members 31 pierces the reflection sheet 2 to be fixed to the rear frame 1 and supports the backlight 3.

On shorter sides of the rear frame 1, a pair of light frames 6 for retaining the lamp holders 30 and bent-back portions of the backlight 3 is provided, and the pair of light frames is attached from the upper face side. The paired light frames 6 are shaped in the form of a pedestal, and laid out so that they are in contact with the bottom portion 11 and the connecting portion 121 of the rear frame 1. Also, the pair of light frames 6 has support portions 61 which form the same plane as that formed by the support portions 122 of the rear frame 1 when the pair of support portions 61 is placed in position along the corresponding shorter sides.

The liquid crystal panel 4 includes: a cell guide 41; a diffusion plate 42 and a diffusion sheet 43, which are for diffusing light emitted by the backlight 3, and light reflected off the reflection sheet 2; and a liquid crystal cell 44 having a pair of glass substrates opposed to each other and a gap which is located between the paired substrates and filled with liquid crystal. The diffusion plate 42 has outer peripheral portions supported by the pair of support portions 122 of the rear frame 1 and the support portions 61 of the pair of light frames 6. Over the diffusion plate 42, the two diffusion sheets 43 are laid out.

The cell guide 41 is a rectangular frame-like form which presses four sides of the diffusion plate 42 and four sides of the diffusion sheet 43 from their upper faces toward the support portions 122 of the rear frame 1 and the support portions 61 of the pair of light frames 6. On the cell guide 41, the liquid crystal cell 44 is placed, and the four sides of the liquid crystal cell 44 are retained by the cell guide 41. On the pair of glass substrates of the liquid crystal cell 44, transparent electrodes are formed in pixels so as to be opposed to each other. Light from the diffusion sheet 43 is made to pass through the liquid crystal cell 44 or blocked by applying a predetermined voltage between the opposed transparent electrodes, whereby an image is formed on the liquid crystal panel 4.

The bezel 5 is a frame-like form made of a metal that can cover the rear frame 1 and the pair of light frames 6. The bezel 5 presses the cell guide 41 and the liquid crystal cell 44 of the liquid crystal panel 4 from the upper face toward the rear frame 1 thereby to fix them. The bezel 5 has: an upper face portion 51 which presses an edge portion of the liquid crystal cell 44 from the upper face side thereof; and a side face portion 52 which is bent downward from the outer end of the upper face portion. The side face portion 52 is formed so as to cover the side-wall portions 123 of the rear frame 1 and the outer faces of the paired light frames 6. Also, the bezel 5 has an opening 50 on its upper face side, which allows a user to view an image display area of the liquid crystal panel 4 from the outside.

Figure 2:
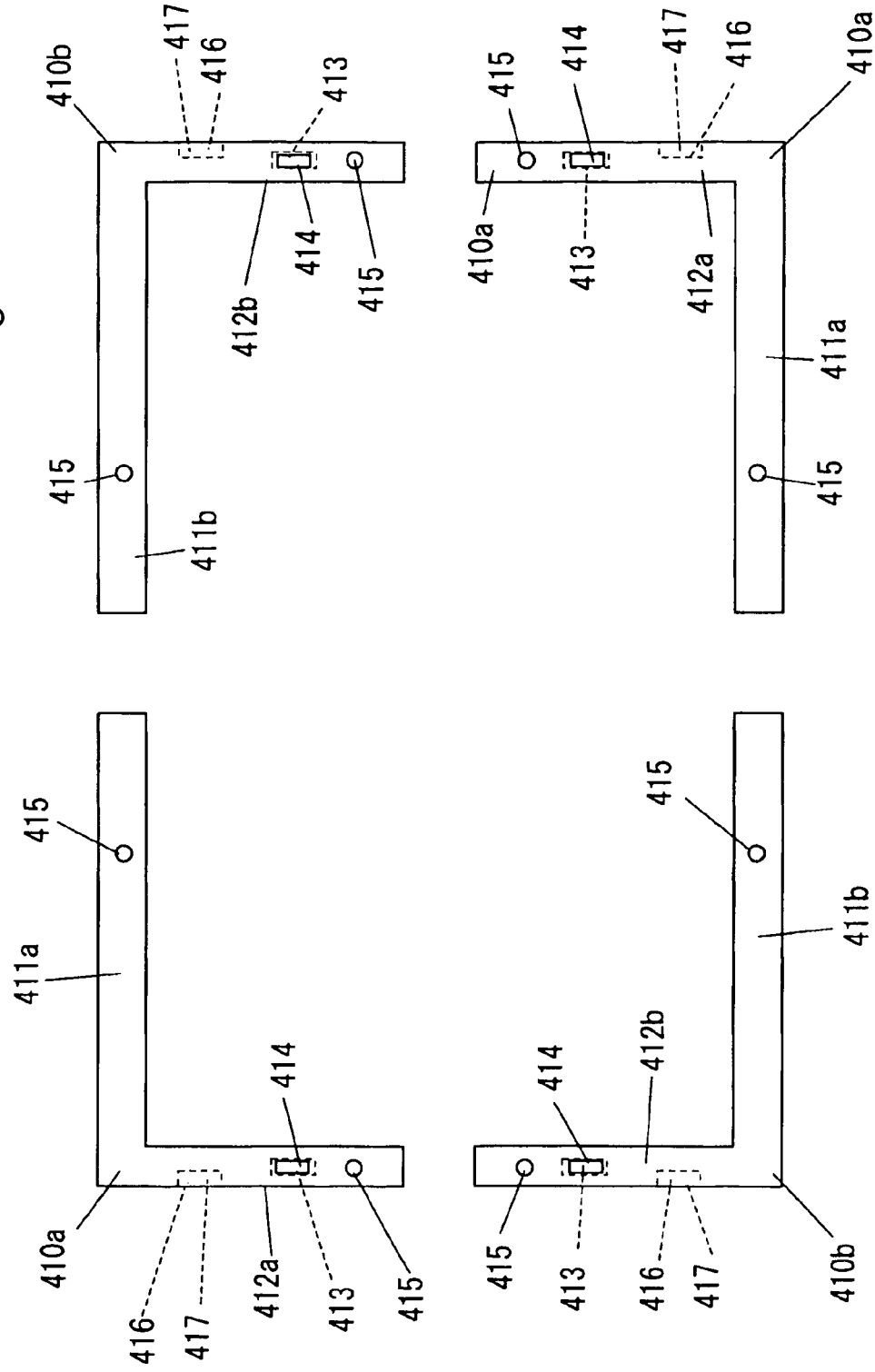
FIG. 2 is a plan view of a cell guide of the liquid crystal display device according to the invention.
Figure 3:
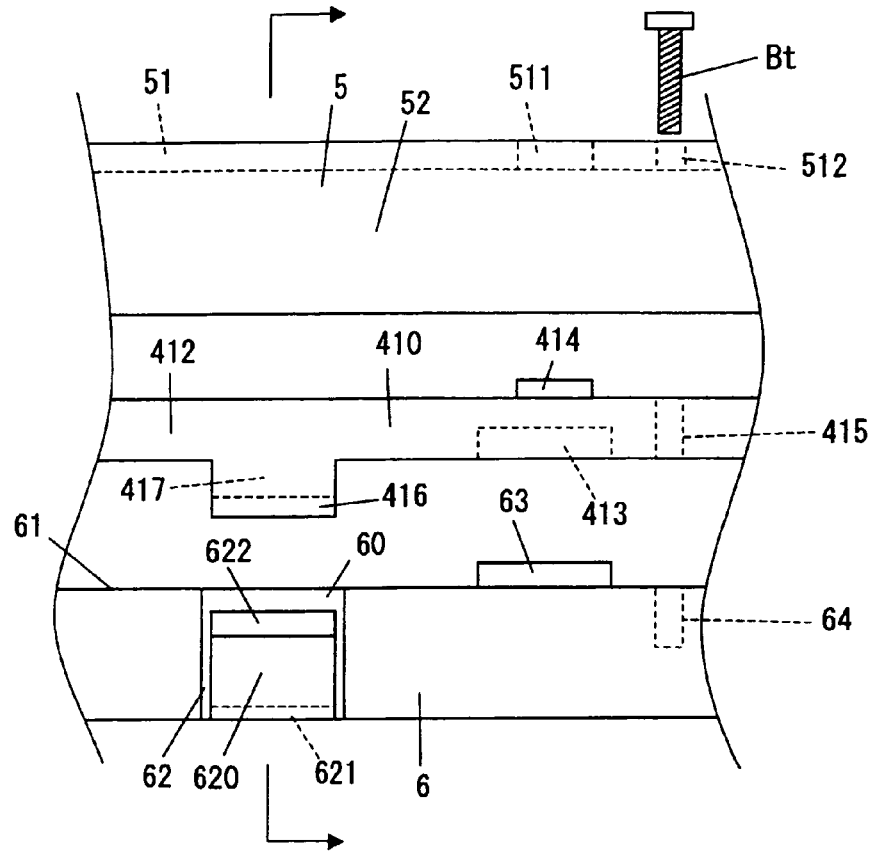
FIG. 3 is an enlarged side view showing a rear frame, a cell guide and a bezel of the liquid crystal display device according to the invention, in which the rear frame, the cell guide and the bezel are disassembled.
Figure 4:
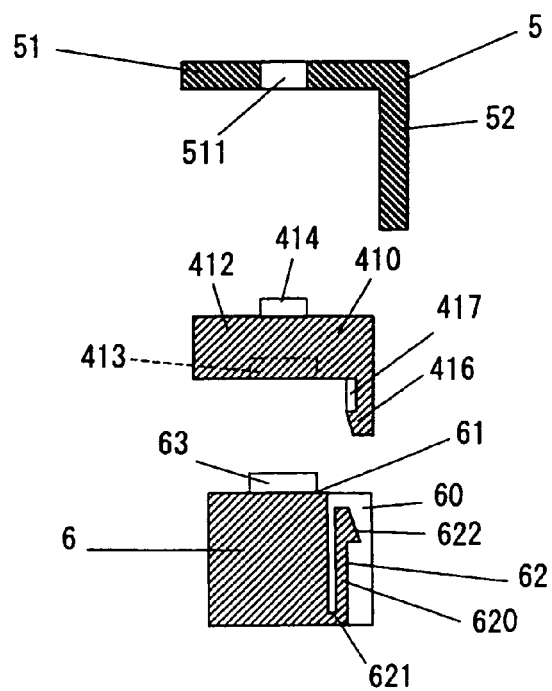
FIG. 4 is an enlarged sectional view showing the rear frame, the cell guide and the bezel of the liquid crystal display device shown in FIG. 3, in which the rear frame, the cell guide and the bezel are disassembled.

FIG. 2 is a plan view of the cell guide of the liquid crystal display device associated with the invention. FIG. 3 is an enlarged side view showing the rear frame, the cell guide and the bezel of the liquid crystal display device associated with the invention, provided that the rear frame, the cell guide and the bezel are disassembled. FIG. 4 is an enlarged sectional view showing the rear frame, the cell guide and the bezel of the liquid crystal display device shown in FIG. 3, in which the rear frame, the cell guide and the bezel are disassembled. As shown in FIG. 2, the cell guide 41 is divided into four pieces each including one corner portion. Specifically, the cell guide 41 has a pair of first L-shaped members 410a and a pair of second L-shaped members 410b. Here, the paired first L-shaped members 410a are in a relation that one is related to the other as a mirror image, which applies to the pair of second L-shaped members 410b. However, this constitutes no restriction on the invention. FIGS. 3 and 4 are enlarged illustrations of the first L-shaped member 410a for the sake of convenience. However, the second L-shaped member 410b has the same structure.

The pairs of first and second L-shaped members 410a and 410b are laid out on respective diagonal lines and assembled. Each first L-shaped member 410a has a long portion 411a and a short portion 412a; and each second L-shaped member 410b has a long portion 411b and a short portion 412b. The pairs of first L-shaped members 410a and second L-shaped members 410b are laid out on the respective diagonal lines of the rectangle of the cell guide 41 to make a combination of the long portion 411a of the first L-shaped members 410a and the long portion 411b of the second L-shaped members 410b, and a combination of the short portion 412a of the first L-shaped members 410a and the short portion 412b of the second L-shaped members 410b respectively, whereby the cell guide 41 is assembled.

As shown in FIGS. 2, 3 and 4, the cell guide 41 has, in each short portion 412, a reentrant portion 413 formed on the lower face side thereof, a boss 414 formed protruding from the upper face side of the long portions 411 and short portions 412, and a through-hole 415 to screw a bolt in. Also, the cell guide 41 includes, in the short portion 412, an engagement portion 416 provided upright below the outer edge. Inside the engagement portion 416, a pouch-like portion 417 open to the inside of the cell guide 41 is formed.

As shown in FIG. 1, the pair of light frames 6 is attached to the shorter side portions of the rear frame 1. As shown in FIGS. 2 and 3, each of the paired light frames 6 has a set of locking portions 62 formed so that they face the outside when the pair of light frames 6 is attached to the rear frame 1 and bosses 63 formed protruding from the support portions 61; a locking nail 622 of each locking portion 62 can be engaged.

As shown in FIG. 3, each locking portion 62 is laid out in a reentrant groove 60 formed in each of the paired light frames 6, and it has an adjoining piece 621 integrally formed with a bottom face of each of the paired light frames 6, an elastic locking piece 620 provided upright extending from an end portion of the adjoining piece 621 on the upper face side, and a locking nail 622 protruding from an end portion of the elastic locking piece 620 outwardly. The set of locking portions 62 are formed so that they can be deformed elastically. The set of locking portions 62 are formed near opposing two end portions of each of the paired light frames 6. However, this makes no restriction on the invention. The bosses 63 each have a cylindrical form protruding from the corresponding support portion 61. Each of the paired light frames 6 has two or more bosses 63 (see FIGS. 3 and 4). Also, in each of the paired light frames 6, an internal thread hole 64 with which a bolt Bt is mated is formed.

In addition, as shown in FIGS. 3 and 4, the bezel 5 has, in the upper face portion 51, a boss hole 511 which is engaged with the boss 414 formed on the upper face side of the cell guide 41 protruding from there, and a bolt hole 512 formed in position that it overlies the through-hole 415 of the cell guide 41.

In assembling the liquid crystal display device A having the structure as described above, the reflection sheet 2 is set from the upper face side of the rear frame 1 so that it is in close contact with the bottom portion 11 and the connecting portion 121, and then the pair of light support members 31 are attached thereon. In this step, the reflection sheet 2 is stuck to the rear frame 1 by a double-sided adhesive tape. However, this makes no restriction. After having placed the backlight 3 on upper portions of the light support member 31, the paired light frames 6 for retaining lamp holders 30 and U-shaped bent-back portions of the backlight 3 from their upper portions are disposed along the shorter sides of the rear frame 1.

Each of the paired light frames 6 has bosses (not shown), and the bosses are passed through the through-holes (not shown) of the rear frame 1. Thus, the position of the pair of light frames 6 is decided, and the pair of light frames is disposed. The support portions 61 of the pair of light frames 6 form the same plane as that formed by the support portions 122 of the rear frame 1. Thereafter, the diffusion plate 42 is disposed from the upper face side of the rear frame 1, i.e. from the side on which the pair of light frames 6 is disposed. The position of the diffusion plate 42 is determined by forcing the diffusion plate to abut on positioning members (not shown) formed on the pair of light frames 6, whereby the diffusion plate is disposed. Subsequently, two diffusion sheets 43 are laid on the upper face side of the diffusion plate 42.

In this situation, the cell guide 41, which has been assembled previously, is set thereon from the upper face side. In this step, the bosses 63 formed on the pair of light frames 6 are fit in the reentrant portions 413 formed in the short portions 412 of the cell guide 41, whereby the positioning of the cell guide 41 is performed. In this action, the engagement portions 416 of the short portions 412 elastically deform the locking portions 62 of the pair of light frames 6, and then the locking nails 622 are engaged with the corresponding pouch-like portions 417 of the engagement portions 416. Thus, the cell guide 41 is temporarily fixed to the support portions 122 of the rear frame 1 and the upper portions of the support portions 61 of the pair of light frames 6 correctly and reliably.

As a result of such arrangement of the cell guide 41, the through-holes 415 of the cell guide 41 are located just above the internal thread holes (not shown) formed in the support portions 122 of the rear frame 1 and the tapped holes 64 formed in the support portions 61 of the pair of light frames 6.

Then, the liquid crystal cell 44 is disposed so that it is engaged with groove portions formed in the upper face of the cell guide 41. In this condition, the bezel 5, which has been assembled in advance, is disposed from the upper face side. In this step, as the bezel 5 has the boss holes 511 formed therein, the position of the bezel 5 is decided by passing the bosses 414 of the cell guide 41 through the boss holes 511, whereby the bezel 5 is disposed (see FIGS. 3 and 4). At this time, the through-holes 512 formed in the bezel 5 overlie the through-holes 415 of the cell guide 41 and the internal thread holes 64 of the pair of light frames 6. At the final step, bolts are passed through the through-holes 512 and through-holes 415 from the upper portion of the bezel 5 and mated with the internal thread holes 64, whereby the bezel 5 and the cell guide 41 are fixed to the pair of light frames 6. Likewise, the internal thread holes (not shown) formed in the support portion 122 of the rear frame 1, the through-holes 512 of the bezel 5, and the through-holes 415 of the cell guide 41 are bolted together, whereby the bezel 5 and the cell guide 41 are fixed to the rear frame 1.

According to the assembling method as described above, the bezel 5 and the cell guide 41 are fastened by the bolts together with the rear frame 1 and the pair of light frames 6. Therefore, the liquid crystal panel 4 can be attached to the assembly of the rear frame 1 and the pair of light frames 6 without any clearance and deformation.

As described above, when the pouch-like portions 417 of the engagement portion 416 are engaged with the corresponding locking nails 622 of the pair of light frames 6 in disposing the cell guide 41, the cell guide 41 can be prevented from being out of position or coming off in assembling the liquid crystal display device A and moving the workpiece during the time of assembling. In addition, as bolts dedicated for use of securing the cell guide 41 (before securing the bezel 5) are not required, the number of members can be reduced accordingly. Also, the number of the through-holes formed in the cell guide 41 can be reduced, and therefore deterioration in the strength of the cell guide 41 can be suppressed.

Further, fastening the bezel 5 together with other members allows the liquid crystal panel 4 to be brought into close contact with the rear frame 1 and the pair of light frames 6 as well as to be kept in a flat posture. Thus, the leakage of light and the disorder of an image can be suppressed and an image can be displayed with stability.

While the embodiments of the invention have been described above specifically, the invention is not limited to the embodiments. Various changes and modifications may be made without departing from the subject matter hereof.

The invention can be adopted for liquid crystal display devices.

What is claimed is:

1. A liquid crystal display device, comprising:
   a rear frame formed by cutting and bending a metal plate,
      the rear frame including a rectangular bottom portion, a pair of connecting portions extending from two longer sides of the bottom portion slantwise upward with respect to the bottom portion, and a pair of support portions bent from the respective connecting portions outwardly in parallel with the bottom portion;

a pair of light frames for retaining a backlight on its lower side;

a rectangular diffusion plate for diffusing light disposed on the pair of light frames and the pair of support portions;

a rectangular diffusion sheet superposed on the diffusion plate;

a cell guide of a rectangular frame-like form for holding down outer peripheral portions of the diffusion plate and diffusion sheet;

a liquid crystal cell, disposed on an upper portion of the cell guide and having a pair of opposing glass substrates with liquid crystal filled in a space therebetween; and a bezel of a rectangular frame-like form for holding down the cell guide and liquid crystal cell, characterized in that the cell guide has longer side portions, shorter side portions, an engagement portion provided vertically downward extending from an outer edge of each shorter side portion on a lower face side of the cell guide, and having a pouch-like portion open to an inside of the cell guide, and a reentrant portion formed in each shorter side portion on the lower face side, each of the paired light frames has bosses protruding from an upper face thereof, and locking portions each having a locking nail protruding to an outer face side when the pair of light frames is attached to the rear frame, and formed so as to be elastically deformable, and the cell guide is positioned by fitting the bosses of the pair of light frames in the reentrant portions, and engaging the engagement portions with the corresponding locking nails of the pair of light frames, and is fastened to the rear frame or the pair of light frames by bolts together with the bezel.

2. The liquid crystal display device of claim 1, characterized in that the cell guide is composed of four L-shaped members adjoined to one another, and each L-shaped member has a long portion forming a part of the longer side portion, and a short portion forming a part of the shorter side portion, in which the long and short portions are formed so as to intersect at right angles.

3. The liquid crystal display device of claim 1, characterized in that at least one of the locking portions is formed for each of the paired light frames respectively arranged for two shorter sides of the rear frame, and at least one of the engagement portions is formed for each of the shorter side portions of the cell guide.

4. The liquid crystal display device of claim 2, characterized in that at least two of the locking portions are formed for each of the paired light frames respectively arranged for two shorter sides of the rear frame, and at least one of the engagement portions is formed for the short portion of each L-shaped member.

5. A liquid crystal display device, comprising:

a rear frame formed by cutting and bending a metal plate, the rear frame including a rectangular bottom portion, a pair of connecting portions extending from two longer sides of the bottom portion slantwise upward with respect to the bottom portion, and a pair of support portions bent from the respective connecting portions outwardly in parallel with the bottom portion;

a reflection sheet disposed in close contact with the bottom portion and the pair of connecting portions of the rear frame;

a backlight having a set of U-shaped cathode tubes disposed above the reflection sheet;

a pair of light frames disposed above the backlight for retaining the backlight;

a rectangular diffusion plate for diffusing light disposed on the pair of light frames and the pair of support portions;

a pair of rectangular diffusion sheets superposed on the diffusion plate, one of the paired rectangular diffusion sheets stacked on the other;

a cell guide of a rectangular frame-like form for holding down outer peripheral portions of the diffusion plate and the pair of diffusion sheets;

a liquid crystal cell, disposed on an upper portion of the cell guide and having a pair of opposing glass substrates with liquid crystal filled in a space therebetween; and a bezel of a rectangular frame-like form for holding down the cell guide and liquid crystal cell, characterized in that the cell guide is divided into four L-shaped members, each of the L-shaped members has a long portion forming a longer side, a short portion adjoining the long portion at a right angle and forming a shorter side, an engagement portion provided vertically downward extending from an outer edge of the short portion on a lower face side of the cell guide, and having a pouch-like portion open to an inside of the cell guide, and a reentrant portion formed on a lower face side of the short portion, each of the paired light frames has bosses protruding from an upper face thereof, reentrant grooves formed on an outer face side of the light frame and extending in an up-and-down direction of the light frame, and a locking portion formed inside each reentrant groove, the locking portion has an adjoining piece integrally formed with and protruded from the light frame, an elastic locking piece provided upright on an upper face side of the adjoining piece, and a locking nail provided and protruded outwardly from an end portion of the elastic locking piece, and the cell guide is positioned by fitting the bosses of the pair of light frames in the reentrant portions, and engaging the engagement portions with the corresponding locking nails of the pair of light frames, and is fastened to the rear frame or the pair of light frames by bolts together with the bezel.

* * * * *